(12) United States Patent
Naden et al.

(10) Patent No.: US 7,786,616 B2
(45) Date of Patent: Aug. 31, 2010

(54) GENERATOR WITH DC BOOST AND SPLIT BUS BIDIRECTIONAL DC-TO-DC CONVERTER FOR UNINTERRUPTIBLE POWER SUPPLY SYSTEM OR FOR ENHANCED LOAD PICKUP

(75) Inventors: Mark Naden, Minneapolis, MN (US); Randall Bax, Andover, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 529 days.

(21) Appl. No.: 10/361,027

(22) Filed: Feb. 7, 2003

(65) Prior Publication Data
US 2004/0155526 A1 Aug. 12, 2004

(51) Int. Cl.
*H02J 9/00* (2006.01)
(52) U.S. Cl. .......................... 307/64; 307/66
(58) Field of Classification Search ............ 307/65, 307/66, 110, 46, 43, 64; 290/40 R, 52
See application file for complete search history.

(56) References Cited

U.S. PATENT DOCUMENTS

| | | | |
|---|---|---|---|
| 4,388,534 A | 6/1983 | Love et al. | |
| 4,401,895 A | 8/1983 | Petkovsek | |
| 4,405,867 A | 9/1983 | Moakler et al. | 307/64 |
| 4,465,943 A | 8/1984 | Risberg | |
| 4,670,702 A | 6/1987 | Yamada et al. | |
| 4,703,191 A | 10/1987 | Ferguson | 307/64 |
| 4,827,152 A | 5/1989 | Farkas | |
| 4,908,565 A * | 3/1990 | Cook et al. | 322/10 |
| 4,912,618 A * | 3/1990 | Krinickas, Jr. | 363/37 |

(Continued)

FOREIGN PATENT DOCUMENTS

EP 1306958 A3 5/2005

(Continued)

OTHER PUBLICATIONS

"Cat UPS Awarded Top 100 R", *Caterpillar Inc.*, http://www.cat.com/industry_solutions/shared/electric_power/whats.../electricpower,(2000),2 pages.

(Continued)

*Primary Examiner*—Albert W Paladini
*Assistant Examiner*—Daniel Cavallari
(74) *Attorney, Agent, or Firm*—Hamre, Schumann, Mueller & Larson, P.C.

(57) ABSTRACT

A local power generation system generates DC voltage at an inverter input, modulated to generate an AC power signal to a load. The inverter input voltage may be obtained from an engine generator, providing a rectified AC power signal. An energy storage device helps maintain DC voltage at the inverter input when load power draw increases or during engine startup or acceleration, for example, until the engine accommodates increased power demand. The system may also be used in an uninterruptible power supply (UPS), in which the load draws power from a utility-provided AC power source until a fault condition appears. When the fault condition appears, the load switches its power draw from the utility-provided AC power source to the inverter output. The energy storage device is charged through a bidirectional DC-to-DC converter and through an inverter operating in rectifier mode to rectify a utility-provided AC power signal.

9 Claims, 2 Drawing Sheets

U.S. PATENT DOCUMENTS

| | | | | |
|---|---|---|---|---|
| 5,053,635 | A | 10/1991 | West | 307/67 |
| 5,198,970 | A | 3/1993 | Kawabata et al. | 363/37 |
| 5,210,685 | A * | 5/1993 | Rosa | 363/109 |
| 5,332,927 | A | 7/1994 | Paul et al. | |
| 5,579,197 | A | 11/1996 | Mengelt et al. | 361/93 |
| 5,606,244 | A * | 2/1997 | Migdal | 322/7 |
| 5,619,076 | A | 4/1997 | Layden et al. | |
| 5,635,773 | A | 6/1997 | Stuart | 307/66 |
| 5,646,458 | A | 7/1997 | Bowyer et al. | |
| 5,670,833 | A | 9/1997 | Mengelt et al. | 307/66 |
| 5,767,591 | A | 6/1998 | Pinkerton | |
| 5,790,391 | A * | 8/1998 | Stich et al. | 363/24 |
| 5,801,937 | A | 9/1998 | Gold et al. | |
| 5,811,960 | A | 9/1998 | Van Sickle et al. | |
| 5,880,537 | A | 3/1999 | Windhorn | |
| 5,905,360 | A | 5/1999 | Ukita | |
| 5,994,794 | A | 11/1999 | Wehrlen | |
| 5,994,795 | A | 11/1999 | Gabillet | |
| 6,002,603 | A * | 12/1999 | Carver | 363/98 |
| 6,094,363 | A | 7/2000 | Cheng | |
| 6,122,181 | A | 9/2000 | Oughton et al. | 363/37 |
| 6,134,124 | A | 10/2000 | Jungreis et al. | 363/34 |
| 6,157,165 | A * | 12/2000 | Kinoshita et al. | 320/116 |
| 6,172,432 | B1 | 1/2001 | Schnackenberg et al. | 307/23 |
| 6,184,593 | B1 | 2/2001 | Jungreis | 307/64 |
| 6,194,880 | B1 | 2/2001 | Fraidlin et al. | 323/222 |
| 6,198,176 | B1 | 3/2001 | Gillette | |
| 6,243,277 | B1 | 6/2001 | Sun et al. | 363/65 |
| 6,266,260 | B1 | 7/2001 | Zahrte, Sr. et al. | 363/132 |
| 6,281,595 | B1 * | 8/2001 | Sinha et al. | 290/40 A |
| 6,288,456 | B1 | 9/2001 | Cratty | 307/64 |
| 6,304,006 | B1 * | 10/2001 | Jungreis | 307/64 |
| 6,344,985 | B1 | 2/2002 | Akerson | 363/65 |
| 6,367,259 | B1 | 4/2002 | Timm | 60/641.8 |
| 6,369,461 | B1 | 4/2002 | Jungreis et al. | 307/46 |
| 6,385,056 | B1 | 5/2002 | Gucyski | 363/15 |
| 6,487,096 | B1 * | 11/2002 | Gilbreth et al. | 363/35 |
| 6,737,762 | B2 * | 5/2004 | Koenig | 307/48 |
| 7,129,593 | B2 * | 10/2006 | King et al. | 290/4 C |
| 2002/0047309 | A1 | 4/2002 | Droppo et al. | 307/43 |
| 2002/0047350 | A1 * | 4/2002 | Pal | 310/68 B |
| 2002/0126517 | A1 | 9/2002 | Matsukawa et al. | 363/69 |
| 2002/0195879 | A1 * | 12/2002 | Okui et al. | 307/64 |
| 2003/0160514 | A1 * | 8/2003 | Rajagopalan | 307/65 |
| 2005/0012395 | A1 * | 1/2005 | Eckroad et al. | 307/44 |

FOREIGN PATENT DOCUMENTS

JP            05328612 A * 12/1993

OTHER PUBLICATIONS

"Cross Coupled Gates Synchronous Rectifier", *IBM Technical Disclosure Bulletin*, http://www.delphion.com/tdbs/tdb?order=92A+62539,(Sep. 1992),462-463.

"Dc-Dc Converter", *IBM Technical Disclosure Bulletin*, http://www.delphion.com/tdbs/tdb?order=83A+61951,(Aug. 1983),1560-1561.

Caricchi, F..,et al. ,"Experimental Study of a Bidirectional DC-DC Converter for the DC Link Voltage Control and the Regenerative Braking in PM Motor Drives Devoted to Electrical Vehicles", *IEEE*, (1994),381-386.

O'Brien, D..,"Indtroduction To Electrochemical Capacitors", *Mallory—North American Capacitor Company*, http://www.nac-cmallory.com/catalog/electrochemical/intromec.htm,(2001),6 pages.

Tolbert, Leon.M. ,et al. ,"A Bi-Directional DC-DC Converter with Minimum Energy Storage Elements", *IEEE*, (2002),6 pages.

Leonhard, W. , "Electrical Engineering between Energy and Information", *Conference Proceedings*, vol. 1, XP010522842, (Aug. 15, 2000),197-202.

Sukumara, G. V., et al., "Fuel Cell Based Uninterrupted Power Sources", *Proceedings of International Conference on Power Electronics and Drive Systems*, IEEE, US XP010244589,(May 26-29, 1997),728-733.

Wichert, B. , "PV-diesel hybrid energy systems for remote area power generation—A review of current practice and future developments", *Renewable and Sustainable Enemy Reviews*, 1 (3), XP004268401,(Sep. 1997),209-228.

* cited by examiner

GENERATOR WITH DC BOOST AND SPLIT BUS BIDIRECTIONAL DC-TO-DC CONVERTER FOR UNINTERRUPTIBLE POWER SUPPLY SYSTEM OR FOR ENHANCED LOAD PICKUP

CROSS-REFERENCE TO RELATED APPLICATIONS

This patent application is related to David J. Koenig's co-pending and commonly-assigned U.S. patent application Ser. No. 09/999,788 entitled "GENERATOR WITH DC BOOST FOR UNINTERRUPTIBLE POWER SUPPLY SYSTEM OR FOR ENHANCED LOAD PICKUP," which was filed on Oct. 26, 2001, and which is incorporated herein by reference in its entirety, including its description of such a system using an energy storage device for providing a DC boost.

TECHNICAL FIELD

This document relates generally to providing electrical power from a fuel-powered generator and particularly, but not by way of limitation, to a generator with DC boost and a split bus bidirectional DC-to-DC converter for an uninterruptible power supply system or for enhanced load pickup.

BACKGROUND

Both businesses and households rely on electrical equipment powered from one-phase, two-phase, three-phase, or other suitable utility-provided alternating-current (AC) power sources. However, commercial power reliability may not suffice for certain applications, for example, for computer facilities, hospitals, banking systems, or industrial motor loads. Therefore, a backup—or even an independent—local power source may be desirable to supplement or substitute for a utility-provided AC power source.

One type of a local power source is a static system, which typically uses an inverter to generate the load's AC power from a direct current (DC) battery bank. Providing power from such a static system for an extended period of time, however, may require a large and costly bank of batteries. Another type of local power source is a rotary system, which typically uses a gasoline or diesel engine to rotate the shaft of an AC generator to produce an AC load current for an extended period of time. In such a system, a providing a stable output voltage signal typically requires a constant rotational shaft velocity. However, load-switching, motor-starting, or other load variations may perturb shaft velocity and, in turn, may perturb the stability of the output voltage signal. A mechanical flywheel storing kinetic energy may assist in maintaining a constant shaft velocity may be maintained by storing kinetic energy, such as in a mechanical flywheel. However, this, provides a bulky, costly, and inefficient solution. For these and other reasons, the present inventors have recognized a need for an improved backup and/or substitute local AC power source.

BRIEF DESCRIPTION OF THE DRAWINGS

In the drawings, which are offered by way of example, and not by way of limitation, and which are not necessarily drawn to scale, like numerals describe substantially similar components throughout the several views. Like numerals having different letter suffixes represent different instances of substantially similar components.

DETAILED DESCRIPTION

The following detailed description refers to the accompanying drawings which form a part hereof. These drawings show, by way of illustration, specific embodiments of practicing the invention. This document describes these embodiments in sufficient detail to enable those skilled in the art to practice the invention. One should understand that the embodiments may be combined, other embodiments may be utilized, or structural, logical and/or electrical changes may be made without departing from the scope of the present invention. The following detailed description is, therefore, not to be taken in a limiting sense, and the scope of the present invention is defined by the appended claims and their equivalents.

Figure 1:
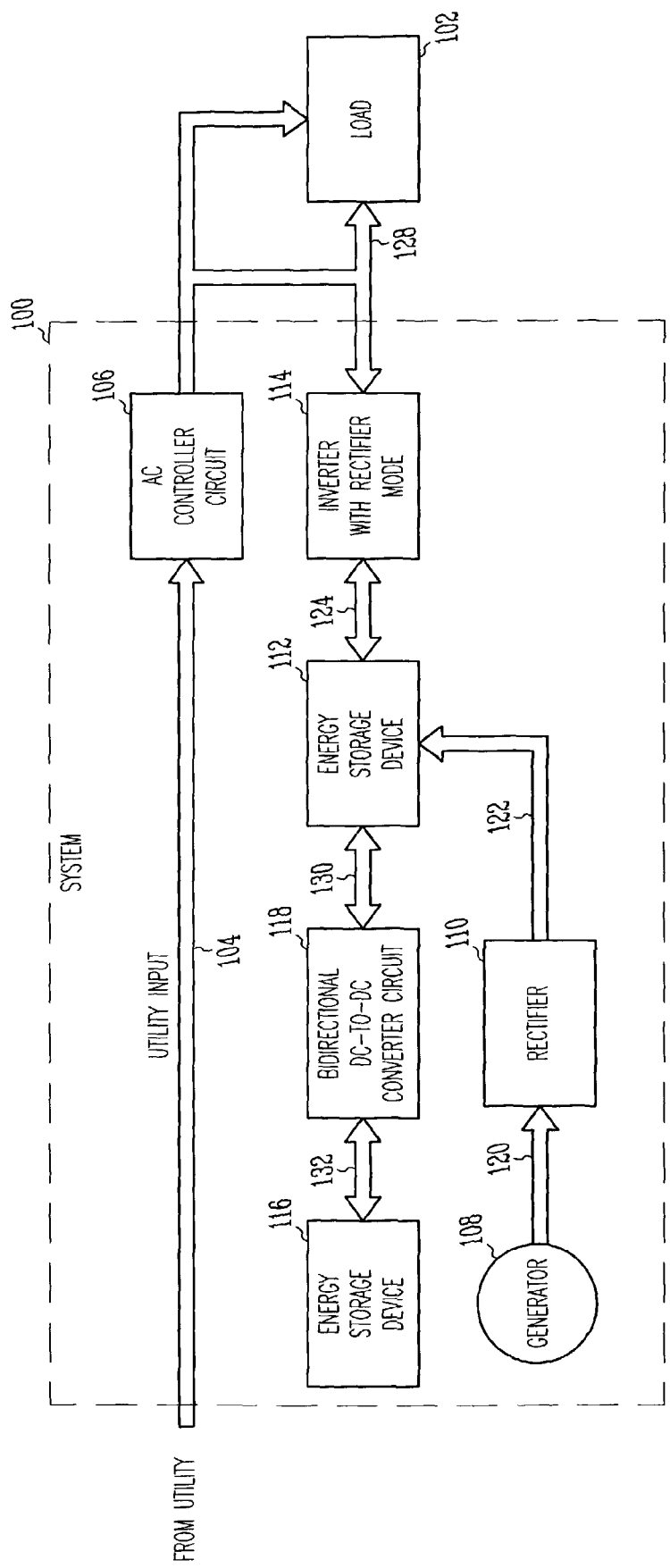
FIG. 1 is a schematic/block diagram illustrating generally one example of a local power generation system that includes, among other things, an enhanced immunity to drawn power variations by the load.

FIG. 1 is a schematic/block diagram illustrating generally one example of a local power generation system 100 that includes, among other things, an enhanced immunity to drawn power variations by the load 102. In this example, the load 102 normally receives AC power from an electrical utility source, such as through a utility input bus 104 and an AC controller circuit 106, which outputs AC power to the load 102. The system 100 also includes an AC power generator 108, a rectifier circuit 110, an energy storage device 112, and an inverter circuit 114, which operate to provide an alternate (e.g., supplementary or substitute) source of AC power to the load 102, such as when the load 102 cannot obtain sufficient AC power from the electrical utility provider. The system also includes an energy storage device 116 and a bidirectional DC-to-DC converter circuit 118, which assist in maintaining an adequate DC voltage stored on the energy storage device 112 at the input of the inverter 114 (such as, for example, during the startup of the generator 108). In one example, energy stored in the energy storage device 116 is received from the utility, such as through the AC controller circuit 106, through the inverter 114 (operating in "reverse" in a rectifier mode), and through the bidirectional DC-to-DC converter 118, as discussed further below.

In one example, the generator 108 is a variable-speed generator powered by, for example, a gasoline engine, a diesel engine, a reciprocating internal combustion engine, a gas turbine, a steam turbine, a Sterling engine, or a rotary engine. The generator 108 provides a multi-phase AC generator output coupled, at the bus 120, to an input of the rectifier 110. The rectifier 110 converts the AC input signal at the bus 120 to a rectified approximately DC output signal. This approximately DC output signal is provided at a rectifier output coupled, at the bus 122, to the energy storage device 112, which, in turn, is located at the input bus 124 of the inverter 114. The inverter 114 converts the DC signal at its input bus 124 to an AC signal provided at an inverter output, which is coupled, at the bus 128, to the load 102.

In this example, the energy storage device 116 includes at least one capacitor to store electrical energy. In one example, the capacitor is an electrochemical capacitor cell (also referred to as an "ultracapacitor" or a "supercapacitor"). The electrochemical capacitor includes a dielectric layer that forms naturally in its electrolyte when an voltage is applied. Because the dielectric may form in a very thin double layer on the surface of the capacitor's electrodes, such an example of an electrochemical capacitor is sometimes referred to as a double layer capacitor (DLC). Although referred to in the art and herein as an electrochemical capacitor, the charge storage typically occurs electrostatically. Other examples of the energy storage device 116 include a rechargeable battery or any other suitable device for storing energy in any form and providing an electrical energy output at the bus 132.

In the example of FIG. 1, because the operating voltage needed at the inverter input at the bus 124 may differ from that obtained at the bus 132 from the energy storage device 116, a switched-mode or other bidirectional converter between these buses performs a DC-to-DC voltage conversion, if needed. In one example, in which the inverter 114 delivers a 60 Hz, 139V rms (line-to-neutral)/240V rms (line-to-line) magnitude three-phase AC signal at the bus 128 to the load 102, an inverter DC input voltage of about 400V is needed at bus 124. In this example, the energy storage device 116 is an electrochemical capacitor storing a DC voltage, provided at the bus 132, that is approximately between 105V and 210V. Therefore, in this example, the bidirectional DC-to-DC converter 118 includes a "step-up" or "boost" mode to translate the voltage at the bus 132 upward to the about 400V needed at the bus 124 to operate the inverter 114.

During normal utility operation, the load 102 receives power from the utility through the AC controller 106. Moreover, during such operation, energy obtained from the utility through the AC controller circuit 106 is stored upon the energy storage device 116 by operating the inverter 114 in a "reverse" or "rectifier" mode in which the inverter 114 operates as a rectifier. Such utility-provided energy passed through the inverter 114, operating in the rectifier mode, is translated downward in voltage (i.e., from a higher approximately DC voltage at the bus 130 to a lower approximately DC voltage at the bus 132) by the bidirectional converter 118.

In steady-state operation during a utility power fault, while the power drawn by the load 102 remains stable, the generator 108 provides such power through the rectifier 110 and the inverter 114. However, during start-up of the generator 108, or when the power drawn by the load 102 increases faster than the generator 108 can accelerate to accommodate the increase (referred to as "surge power"), the bidirectional DC-to-DC converter 118 transfers at least a portion of the energy in the energy storage device 116 to the energy storage device 112 at the inverter input, at the bus 124, to maintain a sufficient DC voltage there. Because the response of the bidirectional converter 118 is faster than the acceleration response of the generator 108, the system 100 provides improved load pickup when a motor in the load 102 is turned on, when other loads are switched into parallel with the load 102, or when the power drawn by the load 102 is otherwise abruptly increased. The energy storage device 116 is sized to provide enough energy storage capacity to maintain the DC voltage at the bus 124 until the speed of the generator 108 increases sufficiently to maintain the needed DC voltage at the bus 124.

Figure 2:
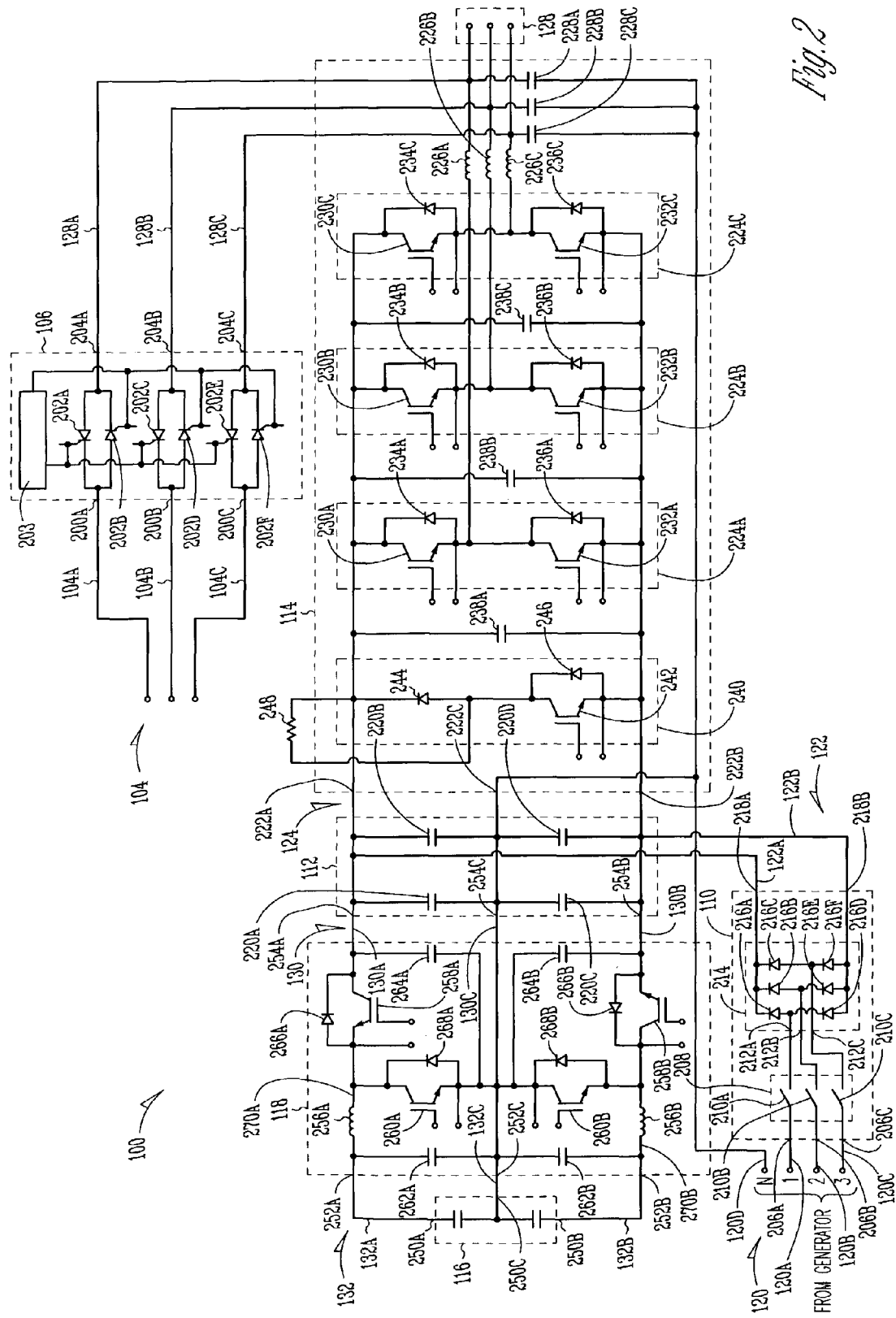
FIG. 2 is a schematic diagram illustrating generally portions of the local power generation system of FIG. 1 in more detail.

FIG. 2 is a schematic diagram illustrating generally, by way of example, but not by way of limitation, portions of the system 100 in more detail. In this example, at the utility bus 104, the system 100 receives a 240V rms (line-to-line) magnitude three phase electrical power signal from the utility provider. The bus 104 includes three separate lines 104A-C for receiving the respective phases of the three phase electrical power signal. The lines 104A-C are received at respective input terminals 200A-C of the AC controller 106. In this example, the AC controller 106 includes, for each phase, back-to-back thyristors (also referred to as semiconductor-controlled rectifiers, or "SCRs") 202A-F, for example, such as included in part number SKUT85/12ES from Semikron International, of Nürnburg, Germany. A gate-control timing circuit 203 is connected to the gate terminals of each of the SCRs 202A-F, such as for controlling their turn-on to provide power factor correction or other desired power conditioning for the electrical power delivered at the three phase output terminals 204A-C of the AC controller 106. The output terminals 204A-C are connected to the respective lines 128A-C of the three phase bus 128 delivering the conditioned electrical power to the load 102. The AC controller 106 also provides isolation between the load bus 128 and the utility bus 104, such as during a utility power fault and for a short time period after the utility comes back online (e.g., until the power signal on the load bus 128 is synchronized to the power signal delivered by the utility bus 104). This avoids overvoltages upon the load bus 128 and/or backflow of electrical power onto the utility line 104 and the associated utility power grid upon reconnection between the utility bus 104 and the load bus 128.

In operation as an uninterruptible power supply (UPS) during a utility power fault, load power is received (in a steady-state) from the generator 108, which has outputs connected to the generator bus 120. The generator bus 120 includes three separate lines 120A-C for receiving the respective phases of the three phase electrical power signal output from the generator 108. The generator bus 120 also includes an additional neutral line 120D, to which the line voltages on the lines 120A-C are referenced, and to which various other nodes in the system 100 must be referenced. In one example, the neutral line 120D is referred to as a "floating neutral line" 120D because it is not electrically connected in common with an actual earth ground.

In the example of FIG. 2, the generator output lines 120A-C are received at respective input terminals 206A-C of the rectifier 110. In this example, the rectifier 110 includes a contactor circuit 208. The contactor 208 includes respective mechanical or other switches 210A-C for contacting the respective generator output lines 120A-C. Through the respective series-connections of these switches 210A-C, the generator output lines 120A-C are connected to respective input terminals 212A-C of a diode-rectifier circuit 214. One example of a suitable diode-rectifier circuit 214 is sold as part number SKD160/16, manufactured by Semikron International of Nürnburg, Germany. In this example, the rectifier circuit 214 includes unidirectional current flow devices, such as diodes 216A-F. In this example, the input terminal 212A is connected to the anode of the diode 216A and the cathode of the diode 216D. The input terminal 212B is connected to the anode of the diode 216B and the cathode of the diode 216E. The input terminal 212C is connected to the anode of the diode 216C and the cathode of the diode 216F. The cathodes of the diodes 216A-C are commonly connected to a positive (with respect to the floating neutral node 12D) voltage output terminal 218A of the rectifier circuit 110. The anodes of the diodes 216D-F are commonly connected to a negative (with respect to the floating neutral node 120D) voltage output terminal 218B of the rectifier circuit 110. The positive voltage output terminal 218A is connected to a line 122A of the bus 122; the negative voltage output terminal 218B is connected to a line 122B of the bus 122. In operation, the rectifier circuit 110 converts the three phase AC electrical signal at the generator output nodes 120A-C to an approximately DC voltage across the nodes 122A-B that is stored upon the energy storage device 112 located at the input bus 124 of the inverter 114.

The energy storage device 112 includes, in this example, four 4700 microFarad capacitors 220A-D, which are referenced to the floating neutral line 120D. The capacitors 220A-B are in parallel with each other, and are located between a positive (approximately) DC voltage node 122A and the floating neutral node 120D. The capacitors 220C-D are in parallel with each other, and are located between a negative (approximately DC voltage) node 122B and the floating neutral node 120D. The input bus 124 to the inverter 114 includes the positive DC voltage node 122A, the negative DC voltage node 122B, and the floating neutral node 120D, which are received at respective input terminals 222A-C of the inverter 114.

The switched-mode inverter 114 includes switching circuits 224A-C, each of which is connected between the positive DC voltage node 122A and the negative DC voltage node 122B. Each switching circuit 224A-C is also inductively coupled, by respective inductors 226A-C, to one of the three-phase lines 128A-C of the load bus 128 to the load 102. Each of the three-phase lines 128A-C of the load bus 128 is also capacitively coupled, by a respective one of capacitors 228A-C, to the floating neutral reference node 120D.

Each switching circuit 224A-C includes a respective switching device, such as an NPN insulated gate bipolar transistor (IGBT) 230A-C having a collector that is coupled to the positive DC voltage node 122A, and having an emitter that is coupled to a respective one of the inductors 226A-C, which, in turn is series-coupled to a respective line of the load bus 128. Moreover, each switching circuit 224A-C also includes a respective switching device, such as an NPN IGBT 232A-C having an emitter that is coupled to the negative DC voltage node 122B, and having a collector that is coupled to an emitter of a respective one of the IGBTs 230A-C, and to a respective one of the inductors 226A-C that is series coupled to the load bus 128. Each switching circuit 224A-C also includes a unidirectional current device, such as a respective diode 234A-C having a cathode connected to a collector of a respective IGBT 230A-C, and having an anode connected to an emitter of the respective IGBT 230A-C. Similarly, each switching circuit 224A-C further includes a unidirectional current device, such as a respective diode 236A-C having a cathode connected to a collector of a respective IGBT 232A-C, and having an anode connected to an emitter of the respective IGBT 232A-C. One example of a switching circuit 224 is available as part number FF200R12KE3ENG, from Eupec, Inc., of Warstein, Germany. In an "inverter mode" of operation, the timing of the switching circuits 224A-C is controlled for switching the IGBTs 230A-C and 232A-C to convert the DC voltages at nodes 122A and 122B to a three phase AC signal delivered to the load 102 by the lines 128A-C of the load bus 128A-C.

In the example of FIG. 2, the inverter 114 also includes three 1.0 microFarad capacitors 238A-C connected between the positive DC voltage node 122A and the negative DC voltage node 122B. The capacitors 238A-C increase the immunity of the positive DC voltage node 122A and the negative DC voltage node 122B to transients caused by high-frequency (e.g., at a frequency of about 17 kHz) switching of the switching circuits 224A-C in the inverter mode of operation.

In the example of FIG. 2, the inverter 114 also includes a dynamic breaking circuit 240. In this example, the dynamic breaking circuit 240 includes an IGBT 242 having an emitter connected to the negative DC voltage node 122B and a collector that is coupled to an anode of a unidirectional current device, such as the diode 244, which has its cathode connected to the positive DC voltage node 122A. A diode 246 includes an anode coupled to the emitter of the IGBT 242 and a cathode that is coupled to the collector of the IGBT 242 and to the anode of the diode 244. A power dissipation resistor is coupled between the positive DC voltage node 122A and the commonly connected anode of the diode 244, collector of the IGBT 242, and the cathode of the diode 246. In one example, the dynamic breaking circuit 240 includes part number BSM200GAL120DLC, available from Eupec, Inc. of Warstein, Germany. In operation, the dynamic breaking circuit 240 is controlled by a voltage sensor at the bus 124. When the DC voltage between node 222A and node 222B exceeds 900V, then the IGBT 242 turns on to dissipate power in the resistor 248. This protects the capacitors 220 from overvoltages and, in turn, protects against overvoltages at the load bus 128 that might otherwise result, for example, when the load power draw decreases abruptly.

The inverter 114 also includes a "rectifier mode" in which the 240V rms (line-to-line) three phase AC electrical energy provided by the utility through the AC controller 106 is rectified by the inverter 114 to provide the approximately 400V DC voltage between the positive DC voltage node 122A and the negative DC voltage node 122B. During such rectifier mode, the IGBTs 230A-C and 232A-C are not switching; they are instead turned off. During this rectification mode, electrical energy flows "backward" through the inverter 114 from the inverter output at load bus lines 128A-C to the inverter input terminals 222A-C. In this mode, the diodes 234A-C and 236A-C provide such rectification. In one example, the rectifier mode of operating the inverter 114 is used during charging of the energy storage device 116.

In the example of FIG. 2, the energy storage device 116 includes terminals 250A-C. The terminal 250A is connected to a positive (relative to the neutral line 120D) DC voltage line 132A of the lower voltage DC bus 132. The terminal 250B is connected to a negative (relative to the neutral line 120D) DC voltage line 132B of the lower voltage DC bus 132. The terminal 250C is connected to the neutral line 132C of lower voltage DC bus 132, which is electrically in common with the neutral line 120D from the generator 108, which is referred to as a "floating neutral" line because it is not in common with or referenced to an earth ground. In this example, the energy storage device 116 includes ultracapacitors providing a total of 32 Farads of capacitance for storing electrical energy. Of this capacity, 16 Farads is provided by 42 parallel ultracapacitor cells connected between terminals 250A and 250C, and another 16 Farads is provided by another 42 parallel ultracapacitor cells connected between terminals 250B and 250C.

The example of FIG. 2 also includes a bidirectional converter 118, which is connected in series between energy storage devices 116 and 112, that is, between lower voltage DC bus 132 and higher voltage DC bus 130. In this example, the bidirectional converter 118 has first terminals 252A-C that are respectively connected to the positive DC voltage line 132A, the negative DC voltage line 132B, and the neutral DC voltage line 132C (which is electrically in common with the floating neutral line 120D). In this example, the bidirectional converter 118 also includes second terminals 254A-C that are respectively connected to the positive DC voltage line 130A, the negative DC voltage line 130B, and the neutral DC voltage line 130C of the higher voltage DC bus 130.

In the example of FIG. 2, the bidirectional converter 118 includes: two approximately 60 microHenry inductors 256A-B; series switching devices such as IGBTs 258A-B; shunt switching devices such as IGBTs 260A-B; shunt capacitors 262A-B (associated with the first terminals 252A-C); shunt capacitors 264A-B (associated with the second terminals 254A-C); diodes 266A-B (respectively associated with IGBTs 258A-B), and diodes 268A-B (respectively associated with IGBTs 260A-B). In one example, a shunt switching device 260 is available in a module together with a series switching device 258, such as part number FF300R12KS4ENG available from Eupec, Inc. of Warstein, Germany.

At the lower voltage DC bus 132, the shunt capacitor 262A is about 1500 microFarads and is connected between the positive DC voltage line 132A and the neutral DC voltage line 132C, which is electrically in common with the neutral line 120D output from the generator 108. The shunt capacitor 262B is about 1500 microFarads and is connected between the negative DC voltage line 132B and the neutral DC voltage line 132C, which is electrically in common with the neutral line 120D output from the generator 108.

At the higher voltage DC bus 130, the shunt capacitor 264A is about 4 microFarads and is connected between the positive DC voltage line 130A and the neutral DC voltage line 130C, which is electrically in common with the neutral line 120D output from the generator 108. The shunt capacitor 264B is about 4 microFarads and is connected between the negative DC voltage line 130B and the neutral DC voltage line 130C, which is electrically in common with the neutral line 120D output from the generator 108.

The inductor 256A is connected in series between the positive DC voltage line 132A of the lower voltage bus 132 and a node 270A, to which a collector of the NPN IGBT 260A is coupled, and to which an emitter of the NPN IGBT 258A is also coupled. Similarly, the inductor 256B is connected in series between the negative DC voltage line 132B of the lower voltage bus 132 and a node 270B, to which an emitter of the NPN IGBT 260B is coupled, and to which a collector of the NPN IGBT 258B is also coupled. The emitter of the IGBT 260A and the collector of the IGBT 260B are connected in common to the neutral line 120D output from the generator 108. The collector of the IGBT 258A is connected to the positive DC voltage line 130A of the higher voltage DC bus 130. The emitter of the IGBT 258B is connected to the negative DC voltage line 130B of the lower voltage DC bus 130.

An anode of the diode 268A is connected to the emitter of the IGBT 260A (and to the neutral line 120D output from the generator 108) and a cathode of the diode 268A is connected to the collector of the IGBT 260A (at node 270A). An anode of the diode 268B is connected to the emitter of the IGBT 260B (at node 270B) and a cathode of the diode 268B is connected to the collector of the IGBT 260B (and to the neutral line 120D output from the generator 108). An anode of the diode 266A is connected to the emitter of the IGBT 258A (at node 270A) and a cathode of the diode 266A is connected to the collector of the IGBT 258A at the positive DC voltage line 130A of the higher voltage DC bus 130. An anode of the diode 266B is connected to the emitter of the IGBT 258B (at the negative DC voltage line 130B of the higher voltage DC bus 130) and a cathode of the diode 266B is connected to the collector of the IGBT 258B (at node 270B).

In operation, during a boost mode, energy is transferred from the energy storage device 116 (at the lower DC voltage bus 132) to the energy storage device 112 (at the higher DC voltage bus 130). This supports the input voltage at the input bus 124 of the inverter 114 (the lines of the input bus 124 are electrically connected in common to corresponding lines of the higher DC voltage bus 130). Such boost mode energy transfer is useful, for example, during startup of the generator 108, or during a sudden increase in power draw by the load 128 that cannot be accommodated fast enough by accelerating the generator 108.

During the boost mode, the bidirectional converter 118 operates as a switched mode boost converter. The gate terminals of the IGBTs 260A-B are driven by a high frequency switching control signal that switches IGBTs 260A-B on and off, such as at a frequency of about 10 kHz. The IGBTs 258A-B are not switched, but rather, are turned off during the boost mode. However, in the boost mode, power is conducted across the IGBTs 258A-B through their respective parallel diodes 266A-B. In the boost mode of operation, current drawn through the inductors 256A-B produces respective voltages across such inductors that is additive to the voltage across the ultracapacitors of the energy storage device 116. This permits the bidirectional converter 118 to transform the lower voltage (e.g., about 200V) energy stored in the energy storage device 116 at the lower DC voltage bus 132 to into the higher voltage (e.g., about 400V) stored upon the energy storage device 112 at the higher DC voltage bus 130, such as where such a higher voltage is needed to ensure proper operation of the inverter 114. A feedback control loop turns off the switching of the IGBTs 260A-B when the desired voltage (e.g., about 400V) is obtained across the energy storage device 112 (until such voltage falls below the desired value, at which time such switching is resumed).

During a charging mode, energy is transferred from the energy storage device 112 (at the higher DC voltage bus 130) to the energy storage device 116 (at the lower DC voltage bus 132). In one example, such energy obtained from the energy storage device 112 is provided by the utility through the inverter 114 (operating in a rectifier mode, i.e., using the diodes across its switching devices rather than gating such switching devices at a high frequency to perform the DC-to-AC inverter function). In an alternative example, such energy obtained from the energy storage device 112 is provided by the generator 108 through the rectifier 110.

During the charging mode, the bidirectional converter 118 operates as a switched-mode buck converter. The gate terminals of the IGBTs 258A-B are driven by a high frequency control signal that switches the IGBTs 258A-B on and off, such as at a frequency of about 25 kHz. The IGBTs 260A-B are not so switched, but rather, are turned off during the charging mode. However, in the charging mode, current continuity through the inductors 256A-B is preserved by current conduction across the IGBTs 260A-B through their respective parallel diodes 268A-B. A feedback control loop turns off the switching of the IGBTs 258A-B when the desired voltage (e.g., about 200V) is obtained across the energy storage device 116 (until such voltage falls below the desired value, at which time such switching is resumed).

Some of the discussion in this document discuss load pickup and UPS applications in terms of using a generator 108 such as a variable-speed engine generator. However, the system 100 is not so limited. Both the load pickup and UPS techniques discussed above similarly apply to a system 100 in which the generator 108 is a substantially constant speed engine generator. In one such example, the constant speed generator 108 is sized to run at a speed that provides sufficient output power to meet the maximum power draw requirements of the load 102. However, if the load 102 draws surge power beyond that being provided by such a constant speed generator, the system 100 can assist in momentarily providing such surge power. This, in turn, assists in maintaining a constant engine generator speed while accommodating the increased power drawn by the load 102. Similarly, in the UPS applications discussed herein, the generator 108 may be a variable-speed generator or a substantially constant speed generator.

It is to be understood that the above description is intended to be illustrative, and not restrictive. For example, the above-discussed embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects.

What is claimed is:

1. A system for providing uninterruptible, continuous and uniform AC electrical power to a load device, the system including:
   a generator coupled to a combined energy storage device;
   a rechargeable energy storage device coupled to the combined energy storage device;
   an AC controller device including an AC controller input adapted to be coupled to a utility-provided AC power source and an AC controller output adapted to be coupled to the load device for providing power from the utility-provided AC power source to the load device and adapted to be coupled to the combined energy storage device for providing power from the utility-provided AC power source to the combined energy storage device for charging the rechargeable energy storage device;
   a converter device coupled at a first end to the combined energy storage device, and adapted to be coupled at a second end to the AC controller circuit and the load device, wherein the converter device operates in an inverter mode and converts DC power provided by the combined energy source to AC power to be delivered to the load device when the utility-provided AC power source is not capable of providing adequate power to the load device, and when the utility-provided AC power source is capable of providing adequate power to the load device, the converter device operates in a rectifier mode and converts AC power from the utility-provided AC power source to DC power to be delivered to the combined energy storage device to charge the rechargeable energy storage device, and
   wherein when the utility-provided AC power source is not capable of providing adequate AC power to the load device, the combined energy source provides DC power that is converted into uninterruptible, continuous and uniform AC power to the load device, the combined energy storage device receiving the DC power from the rechargeable energy storage device, and power from the generator working in tandem.

2. The system of claim 1, wherein when the utility-provided AC power source is not capable of providing adequate power to the load device and during start-up of the generator, the combined energy storage device receives DC power, to be converted into AC power and delivered to the load device, from the rechargeable energy storage device, and
   wherein when the utility-provided AC power source is not capable of providing adequate power to the load device and after start-up of the generator, the combined energy storage device receives DC power, to be converted into AC power and delivered to the load device, from the generator.

3. The system of claim 2, wherein when the utility-provided AC power source is not capable of providing adequate power to the load device and after start-up of the generator, the combined energy storage device further receives DC power, to be converted to AC power and delivered to the load device, from the rechargeable energy storage device when power drawn by the load device increases faster than the generator can generate the necessary AC power required to accommodate the increase in AC power needed by the load device.

4. The system of claim 1, further comprising a bidirectional DC-to-DC converter coupled at a first terminal to the rechargeable energy storage device and at a second terminal to the combined energy storage device,
   wherein the bidirectional DC-to-DC converter includes a boost mode to step-up DC voltage provided by the rechargeable energy storage device to the combined energy storage device when the utility-provided AC power source does not provide adequate power to the load device, and
   a charge mode to step-down DC voltage provided by the combined energy storage device to charge the rechargeable energy storage device, the combined energy storage device receiving AC power from the utility-provided AC power source when the utility-provided AC power source provides adequate power to the load device.

5. The system of claim 1, further comprising a rectifier coupled between the generator and the inverter input, the rectifier configured to convert AC power provided by the generator to DC power provided to the combined energy storage device.

6. A method for providing uninterruptible, continuous and uniform AC electrical power to a load device, the method comprising:
   delivering power through an AC controller device from a utility-provided AC power source to the load device if the utility-provided AC power source is capable of providing adequate power to the load device;
   charging a rechargeable energy storage device via a combined energy storage device that receives DC power through the AC controller device from a utility-provided AC power source;
   converting DC power providing by the combined energy source to AC power that is to be delivered to the load device when the utility-provided AC power source is not capable of providing adequate power to the load device, via a converter device, coupled at a first end to the combined energy storage device and is adapted to be coupled at a second end to an AC controller circuit and the load device, operating in an inverter mode;
   converting AC power from the utility-provided AC power source to DC power that is to be delivered to the combined energy storage device to charge the rechargeable energy storage device when the utility-provided AC power source is capable of providing adequate power to the load device, via the converter device operating in a rectifier mode; and
   providing uninterruptible, continuous and uniform AC power to the load device via the combined energy storage device when the utility provided AC power source is not capable of providing adequate power to the load device, the combined energy storage device receiving DC power from the rechargeable energy-storage device, and power from a generator working in tandem.

7. The system of claim 6, wherein when the AC controller device determines that the utility-provided AC power source is not capable of providing adequate power to the load device and during start-up of the generator, the combined energy storage device receives DC power, to be converted into AC power and delivered to the load device, from the rechargeable energy storage device.

8. The system of claim 6, wherein when the AC controller device determines that the utility-provided AC power source is not capable of providing adequate power to the load device and after start-up of the generator, the combined energy storage device receives DC power, to be converted into AC power and delivered to the load device, from the generator.

9. The system of claim 8, wherein when the AC controller device determines that the utility-provided AC power source is not capable of providing adequate power to the load device and after start-up of the generator, the combined energy storage device further receives DC power, to be converted to AC power and delivered to the load device, from the rechargeable energy storage device when power drawn by the load device increases faster than the generator can generate the necessary AC power required to accommodate the increase in AC power needed by the load device.

* * * * *